Figure 1:
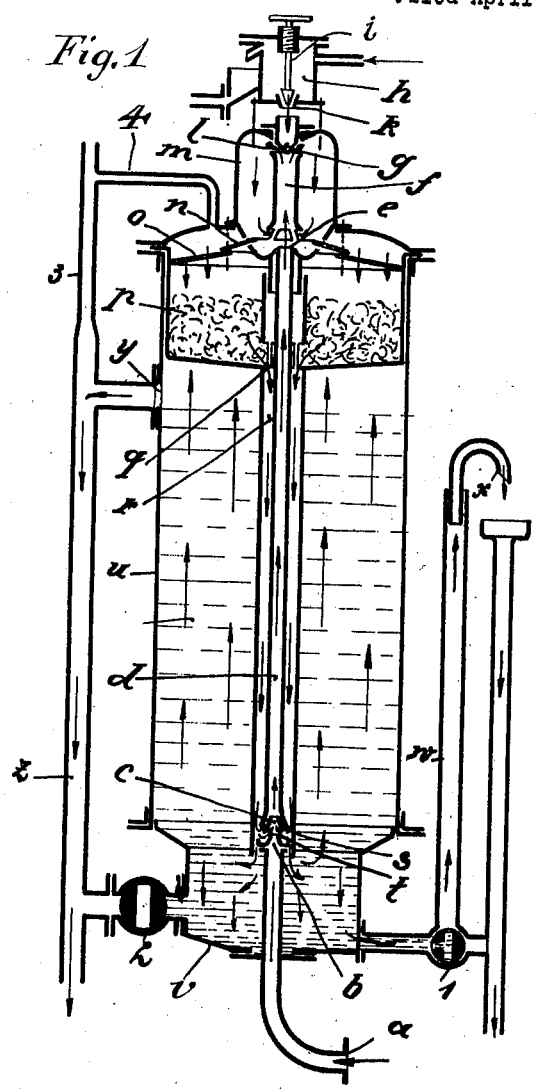

Jan. 4, 1927. 1,613,531
K. PFISTERER
WASHING AND MIXING LIQUIDS
Filed April 30, 1923

Inventor:
Karl Pfisterer
by [signature]
Attorney.

Patented Jan. 4, 1927.

1,613,531

UNITED STATES PATENT OFFICE.

KARL PFISTERER, OF ZUFFENHAUSEN, GERMANY, ASSIGNOR TO EUGEN GRILL, OF ZUFFENHAUSEN, GERMANY.

WASHING AND MIXING LIQUID.

Application filed April 30, 1923, Serial No. 635,710, and in Germany June 2, 1920.

My invention relates to improvements in apparatus for the washing, mixing and saturating of liquids as shown and described in my United States Patent No. 1,404,701, dated January 24, 1922, and comprising a central injector and mixing nozzle and a circulating tube enclosing said injector and nozzle the whole being arranged in a vessel in such a manner that the liquid to be treated and the substance or substances added thereto and which may be solid, are circulated repeatedly from the suction space of the injector through the nozzle, and in a state of fine subdivision, into a sieve box containing the substance or substances to be dissolved, and thereafter through the circulating tube back into the suction space, the liquid thus treated and saturated being finally allowed to escape into the clarifying chamber in the proximity of the suction space.

The present invention refers to improvements in this apparatus which render it particularly suited for the continuous washing or treating of liquids with other liquids, or for the treating of gases with other liquid or gaseous substances. These advantages are due to the following facts: Small quantities of one liquid continuously act on small quantities of another liquid, the two liquids being thoroughly mixed with each other and the mixture being distributed over a rather large surface in order to enlarge the reaction surface and to increase the speed of reaction. The mixture thus treated is then collected and conducted back into the suction space of the jet-pump which is operated by the raw material, and a certain small quantity is allowed to escape each time into the clearing and precipitating chamber forming part of the apparatus. The separation of the reaction products having a considerably higher specific gravity proceeds very quickly by reason of the favorable, mechanically separate conduction of the current, in connection with a continuous decrease of its velocity first in upward thereafter in downward direction.

The supply of reagents is effected continuously with the aid of exactly regulable apportioning or distributing devices. The reaction products are withdrawn automatically and continuously by aid of float valves or by overflow pipes operating according to the law of communicating tubes no losses being experienced, as there remains a sealing layer of the reaction products between the outlet and the raw material. Every portion of the mixture is washed completely in a single washing operation, the step-wise washing out being then transformed into a continuous operation. Owing to these extraordinarily favorable circumstances the efficiency is considerably increased, whereas the dimensions of the apparatus are greatly reduced and almost no attendance is required.

In the drawing affixed to this specification and forming part thereof a device embodying my invention is illustrated diagrammatically by way of example. In the drawings—

Figure 2:
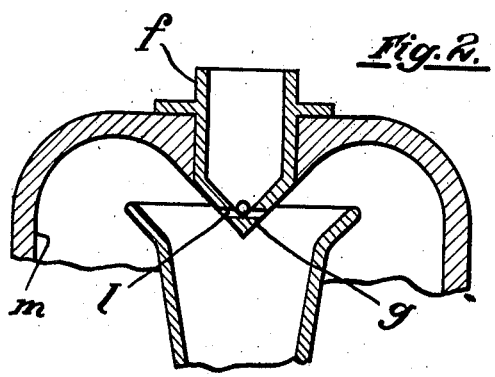

Fig. 1 is a vertical axial section of the device and Fig. 2 shows a detail on a larger scale, also in axial section.

Referring to the drawings, the liquid which enters into the apparatus under pressure through the pipe $a$ (Figure 1) escapes with considerable velocity from the injector nozzle $b$ into the mixing nozzle $c$, and flows upwards through a delivery pipe $d$ from which it escapes through the upper orifice $e$. Concentrically opposite the orifice $e$ is arranged the preliminary mixing nozzle $f$ through which the jet at first passes freely but is thereafter diverted to all sides by impinging upon a conical deflector $g$. (Figure 2). At the same time the reagent supply vessel $h$ is set operating by means of the valve spindle $i$ which is so turned as to open the discharge opening $k$, the reagent escaping through this opening and apertures $l$ located below it into the current of liquid escaping at the upper end of the preliminary mixing nozzle $f$, this liquid being distributed to all sides by the bottom of the cone $g$.

The mixture thus obtained now flows down along the inner wall of a vessel $m$ which surrounds the nozzle $f$ and forms a preliminary mixing chamber. Owing to the partial vacuum produced by the jet escaping from the orifice $e$ of the delivery pipe $d$ the mixture of the liquid and the reagent is carried along with the jet from $e$ back into the nozzle $f$ and is there intensely whirled through with fresh liquid escaping from the orifice $e$, there being always also a fresh quantity of the reagent mixed with the liquid from $e$. In this manner a continuous circulation and a constant effective mixing of the two liquids, i. e. that from the delivery pipe $d$ and the reagent from the vessel $h$, is obtained already in the upper part of the apparatus. At the same time a certain part of the mixture constantly passes through the annular passage $n$ into the distributing chamber $o$ filled with plates or the like $p$ and having central slots $q$ through which the liquid escapes into a jacket $r$ surrounding the delivery pipe $d$. At the lower end of the jacket $r$ there are arranged the nozzles $b$ and $c$, and owing to the suction produced by these nozzles, there are formed suction spaces $s$ and $t$ into which rushes the liquid coming from the jacket $r$. The greatest part of this liquid is carried upwards through the delivery pipe $d$ by the jet issuing from the nozzles $b$ and $c$, and the mixture is carried once more into the preliminary mixing nozzle $f$ where it is then diverted sideways by the distributing cone $g$, as already described. The liquid thus distributed is again mixed with the reagent escaping through $l$ and flows back into the chamber $m$ to be divided at the bottom thereof, part being carried back upwards into the nozzle $f$, while the rest escapes through the annular passage $n$ into the chamber $o$, and through the slots $q$ into and through the jacket $r$ until it reaches the suction spaces $s$ and $t$.

The jacket $r$ is surrounded by a liquid tank $u$, and a settling tank $v$ is provided at the base of said liquid tank. The heavier constituents and products of reaction collect in the tank $v$ and may be removed through an overflow pipe $w$ provided with a cock 1. The lighter constituents or products rise in the tank $u$ and are discharged at $y$ into a tube $z$.

A drain cock 2 connects the settling tank $v$ with the pipe $z$, and a vent pipe 4 at the top of the apparatus is also connected with the pipe $z$ through a pipe 3 of smaller diameter, the object of these pipes being to prevent pressure surges.

The settling tank $v$ and all other parts of the apparatus which require cleaning are detachable so that maintenance and repairs may be effected readily and without delay.

I wish it to be understood that I do not desire to be limited to the exact details of construction and operation shown and described, for obvious modifications will occur to a person skilled in the art.

I claim:

1. Liquid mixing device comprising a tank, an injector adapted to impart motion to liquid in said tank, a delivery pipe connected with said injector, a mixing nozzle, and a reagent distributing device, both arranged above the upper end of said delivery pipe.

2. Liquid mixing device comprising a tank, an injector adapted to impart motion to liquid in said tank, a delivery pipe connected with said injector, a mixing nozzle arranged above the upper end of said delivery pipe, and a reagent distributing device arranged above said mixing nozzle.

3. Liquid mixing device comprising a tank, an injector adapted to impart motion to liquid in said tank, a delivery pipe connected with said injector, a mixing nozzle arranged above the upper end of said delivery pipe, a reagent distributing device arranged above said mixing nozzle, and a deflector formed on said distributing device coaxially with said mixing nozzle.

4. Liquid mixing device comprising a tank, an injector adapted to impart motion to liquid in said tank, a delivery pipe connected with said injector, a mixing nozzle arranged above the upper end of said delivery pipe, a reagent distributing device arranged above said mixing nozzle and a conical deflector formed on said distributing device coaxially with said mixing nozzle.

5. Liquid mixing device comprising a tank, an injector adapted to impart motion to liquid in said tank, a delivery pipe connected with said injector, a liquid return jacket surrounding said injector and extending as far as its liquid admission opening, a mixing nozzle, and a reagent distributing device both arranged above the upper end of said delivery pipe.

6. Liquid mixing device comprising a tank, an injector adapted to impart motion to liquid in said tank, a delivery pipe connected with said injector, a mixing nozzle, a reagent distributing device, both arranged above the upper end of said delivery pipe, and a perforated partition in said tank.

7. Liquid mixing device comprising a tank, an injector adapted to impart motion to liquid in said tank, a delivery pipe connected with said injector, a liquid return jacket surrounding said injector and extending as far as its liquid admission opening, a perforated partition inserted between said jacket and the shell of said tank, said jacket defining slots above said partition, a mixing nozzle, and a reagent distributing device both arranged above the upper end of said delivery pipe.

In testimony whereof I affix my signature.

KARL PFISTERER.